US012561510B2

(12) United States Patent
Sachdeva et al.

(10) Patent No.: US 12,561,510 B2
(45) Date of Patent: Feb. 24, 2026

(54) DETECTING AND PROCESSING CURVED TEXT IN DOCUMENTS

(71) Applicant: Adobe Inc., San Jose, CA (US)

(72) Inventors: Paridhi Sachdeva, Noida (IN); Parth Patel, Vadodara (IN); Mohit Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 18/593,684

(22) Filed: Mar. 1, 2024

(65) Prior Publication Data

US 2025/0278546 A1 Sep. 4, 2025

(51) Int. Cl.
*G06V 30/414* (2022.01)
*G06F 40/103* (2020.01)
(52) U.S. Cl.
CPC .......... *G06F 40/103* (2020.01); *G06V 30/414* (2022.01)
(58) Field of Classification Search
CPC ............................ G06F 40/103; G06V 30/414
See application file for complete search history.

(56) References Cited

U.S. PATENT DOCUMENTS

2019/0026550 A1* 1/2019 Yang ...................... G06N 3/045
2025/0022301 A1* 1/2025 Long ............... G06V 30/19173

OTHER PUBLICATIONS

Liu et al. "Towards Robust Curve Text Detection with Conditional Spatial Expansion", 2019, 12 pgs. Liu.pdf (Year: 2019).*
Baek, Y. et al., "Character Region Attention For Text Spotting," arXiv:2007.09629v1 [cs.CV], Jul. 19, 2020, pp. 1-17.
Du, Y. et al., "SVTR: Scene Text Recognition with a Single Visual Model," arXiv: 2205.00159v2 [cs.CV], May 23, 2022, pp. 1-7.
Sheng, T. et al., "Centripetal Text: An Efficient Text Instance Representation for Scene Text Detection," arXiv:2107.05945v3 [cs.CV], Jan. 15, 2022, pp. 1-17.
Wang, P. et al., "PGNet: Real-time Arbitrarily-Shaped Text Spotting with Point Gathering Network," arXiv:2104.05458v1 [cs.CV], Apr. 12, 2021, pp. 1-10.
Wang, W. et al., "Shape Robust Text Detection with Progressive Scale Expansion Network," arXiv:1903.12473 [cs.CV], Jul. 29, 2019, pp. 1-13.
Zhang, S.-X., "Adaptive Boundary Proposal Network for Arbitrary Shape Text Detection," arXiv:2107.12664v5 [cs.CV], Aug. 13, 2021, pp. 1-10.

* cited by examiner

*Primary Examiner* — Haoshian Shih
(74) *Attorney, Agent, or Firm* — Nicholson De Vos Webster & Elliott LLP

(57) ABSTRACT

Embodiments are disclosed for a process of detecting and processing curved text in a document using a digital design system. The method may include identifying, by a page segmentation model, a plurality of paragraph objects in a document. The disclosed systems and methods further comprise determining that a paragraph object of the plurality of paragraph objects includes curved text in view of positions of baselines of text runs in the paragraph object. The processing of the curved text in the paragraph object can include determining spacing data for text runs of the curved text in the paragraph object. The disclosed systems and methods further comprise presenting output data representing the curved text using the spacing data for the text runs of the curved text.

20 Claims, 11 Drawing Sheets

CURVED
PARAGRAPH
OBJECTS 602
CURVED TEXT PROCESSING MODULE 116
PARAGRAPH OBJECT SPLITTING MANAGER 604
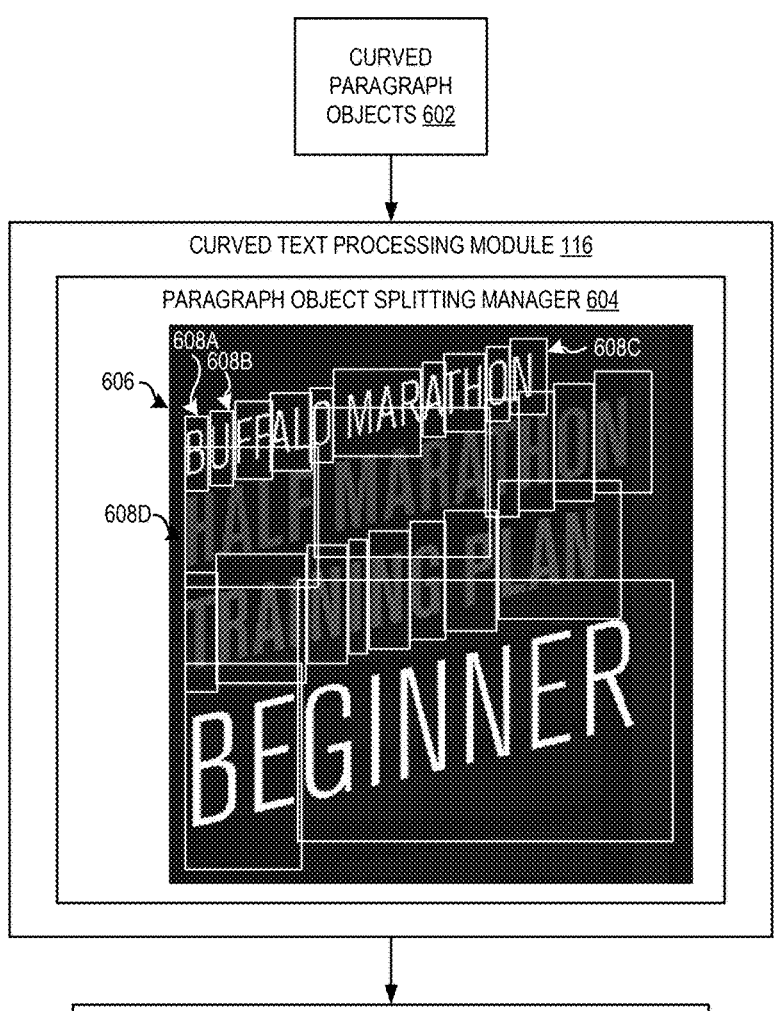
UPDATED CURVED PARAGRAPH OBJECTS 610
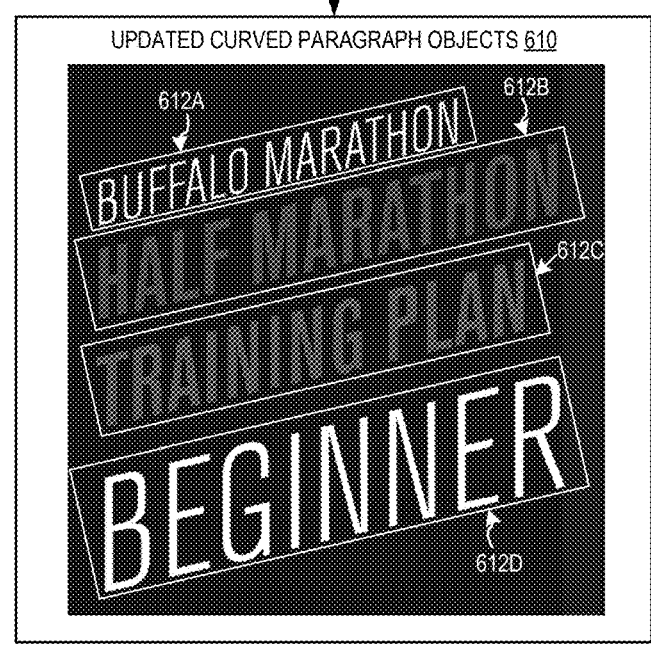
*FIG. 6*

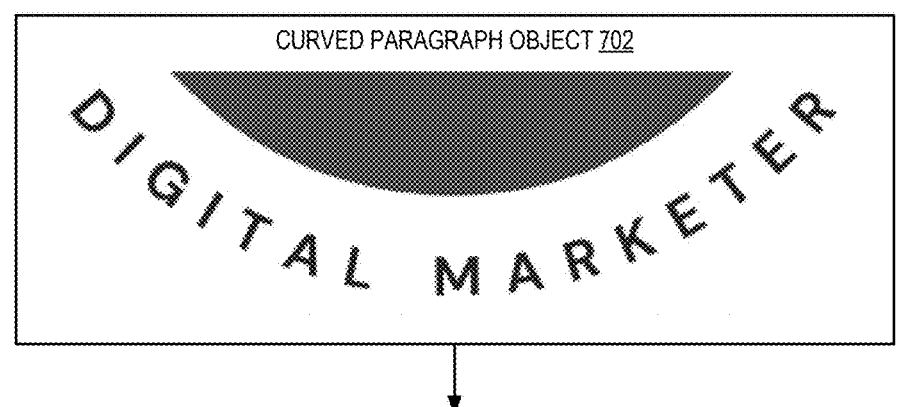
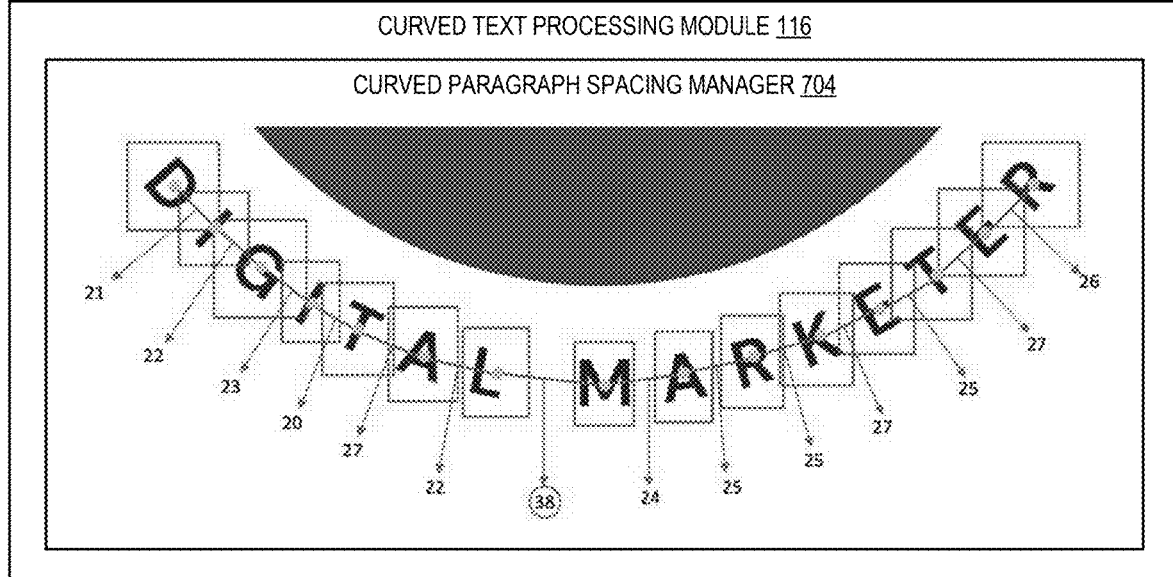
*FIG. 7*

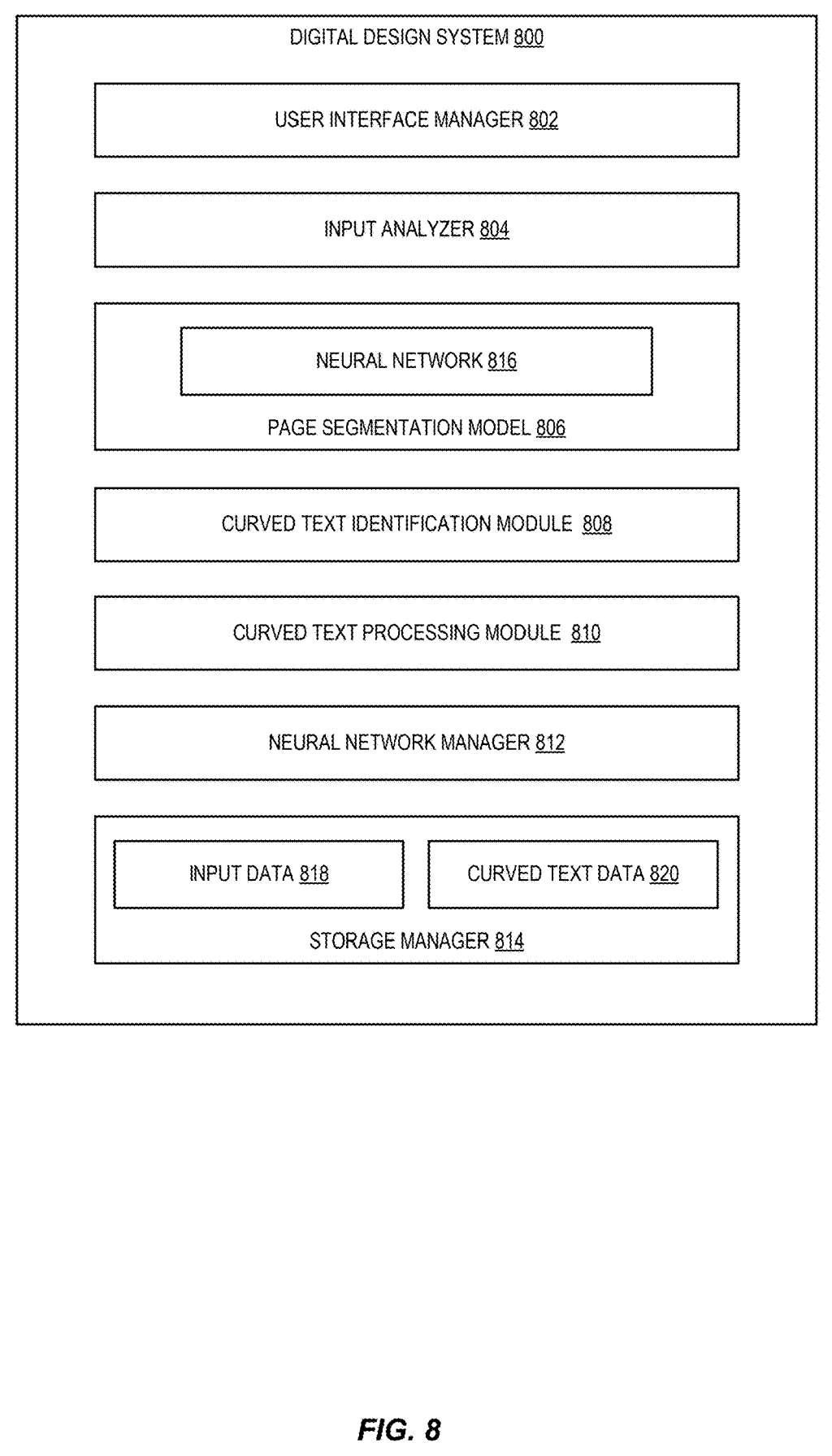

DIGITAL DESIGN SYSTEM 800

USER INTERFACE MANAGER 802

INPUT ANALYZER 804

NEURAL NETWORK 816

PAGE SEGMENTATION MODEL 806

CURVED TEXT IDENTIFICATION MODULE 808

CURVED TEXT PROCESSING MODULE 810

NEURAL NETWORK MANAGER 812

INPUT DATA 818

CURVED TEXT DATA 820

STORAGE MANAGER 814

*FIG. 8*

900

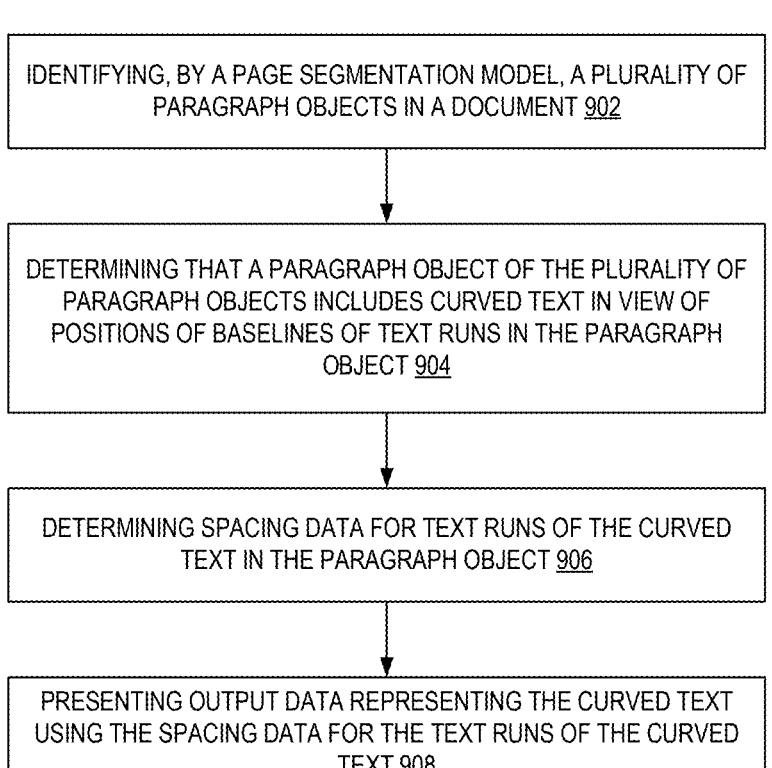

IDENTIFYING, BY A PAGE SEGMENTATION MODEL, A PLURALITY OF PARAGRAPH OBJECTS IN A DOCUMENT 902

DETERMINING THAT A PARAGRAPH OBJECT OF THE PLURALITY OF PARAGRAPH OBJECTS INCLUDES CURVED TEXT IN VIEW OF POSITIONS OF BASELINES OF TEXT RUNS IN THE PARAGRAPH OBJECT 904

DETERMINING SPACING DATA FOR TEXT RUNS OF THE CURVED TEXT IN THE PARAGRAPH OBJECT 906

PRESENTING OUTPUT DATA REPRESENTING THE CURVED TEXT USING THE SPACING DATA FOR THE TEXT RUNS OF THE CURVED TEXT 908

*FIG. 9*

1000

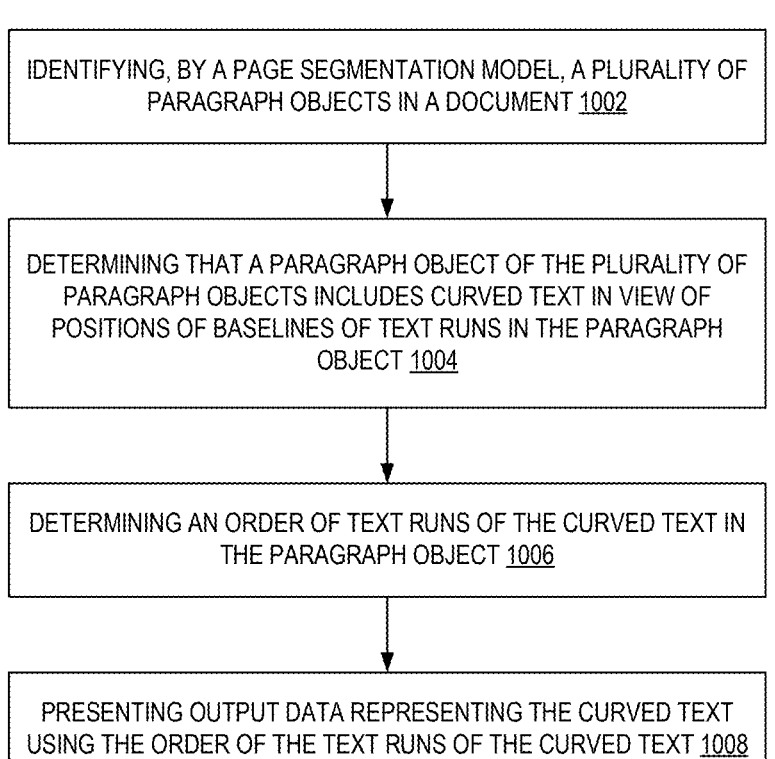

IDENTIFYING, BY A PAGE SEGMENTATION MODEL, A PLURALITY OF PARAGRAPH OBJECTS IN A DOCUMENT 1002

DETERMINING THAT A PARAGRAPH OBJECT OF THE PLURALITY OF PARAGRAPH OBJECTS INCLUDES CURVED TEXT IN VIEW OF POSITIONS OF BASELINES OF TEXT RUNS IN THE PARAGRAPH OBJECT 1004

DETERMINING AN ORDER OF TEXT RUNS OF THE CURVED TEXT IN THE PARAGRAPH OBJECT 1006

PRESENTING OUTPUT DATA REPRESENTING THE CURVED TEXT USING THE ORDER OF THE TEXT RUNS OF THE CURVED TEXT 1008

*FIG. 10*

DETECTING AND PROCESSING CURVED TEXT IN DOCUMENTS

BACKGROUND

Some document types, including portable document format (PDF) documents do not have any structural information, but instead have information on how to render the content on the page. For example, there are no paragraph or text lines in a PDF document, but a sequence of commands to place different characters at different positions on the page. Documents can contain a variety of text elements, including curved text, which can include diagonal text, circular text, semi-circular text, or text on any curved path. However, because PDF documents do not have structure informational, curved text in a document can pose challenges for text extraction, processing, and editing.

SUMMARY

Introduced here are techniques/technologies that allow a digital design system to identify and process curved text in a document that does not have structural information, such as a portable document format (PDF) document.

More specifically, in one or more embodiments, a digital design system processes a document through a pipeline to identify curved text in the document and then processes the curved text to generate data representing the curved text that can be used in downstream applications. The document is first sent to a page segmentation model that is trained to identify various elements, components, or object types within the document and generate bounding boxes. For example, the page segmentation can identify object types including, but not limited to, paragraphs, headings, list-items, footnotes, figures, and tables. The baselines of text in each paragraph (and heading) object are then analyzed to determine whether the object includes curved text. A baseline is the line on which the characters of text sits, with the exception of the descenders on some characters (e.g., "g," "p," etc.) which can extend below the baseline. After determining the bounding boxes that include curved text, the digital design system can process the bounding boxes to generate data representing the curved text that can be used by downstream application (e.g., graphics editors) to allow for the editing and/or rendering of the curved text. These processing operations can include merging bounding boxes for paragraph objects that may have been incorrectly split by the page segmentation model, splitting bounding boxes for paragraph objects that may have been incorrectly merged by the page segmentation model, determining an order of the characters in the curved text, and/or determining the correct spacing between text runs in the curved text.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 6 illustrates a diagram of a curved text processing module splitting incorrectly merged curved paragraph objects in accordance with one or more embodiments;

FIG. 7 illustrates a diagram of a curved text processing module determining the placement of spaces between text runs in curved paragraph objects in accordance with one or more embodiments;

FIG. 8 illustrates a schematic diagram of a digital design system in accordance with one or more embodiments;

FIG. 9 illustrates a flowchart of a series of acts in a method of identifying and processing curved text in a document by a digital design system in accordance with one or more embodiments;

FIG. 10 illustrates a flowchart of a series of acts in a method of identifying and processing curved text in a document by a digital design system in accordance with one or more embodiments.

DETAILED DESCRIPTION

One or more embodiments of the present disclosure include a digital design system for identifying and processing curved text in documents that do not include structural information. Some existing techniques for curved text detection use neural networks to generate segmentation masks to capture curved text. However, these techniques can be slow and result in inaccurate outputs. For example, these techniques can incorrectly segment a single text run of curved text into multiple objects or completely overlook portions of curved text.

To address these and other deficiencies in conventional systems, the digital design system of the present disclosure utilizes a heuristic-based method to detect curved text in a document that does not include structural information, such as a portable document format (PDF) document. The method uses the rectangular bounding boxes for paragraph objects predicted by a deep-learning page segmentation model and the information about the baselines of text runs present in the paragraph objects to determine the paragraph objects that include curved text. The digital design system can further process the paragraph objects that include curved text by merging incorrectly split paragraph objects, ordering the text runs inside paragraph objects, splitting incorrectly merged paragraph objects, and fixing spacing between characters in the curved text of paragraph objects.

Figure 1:
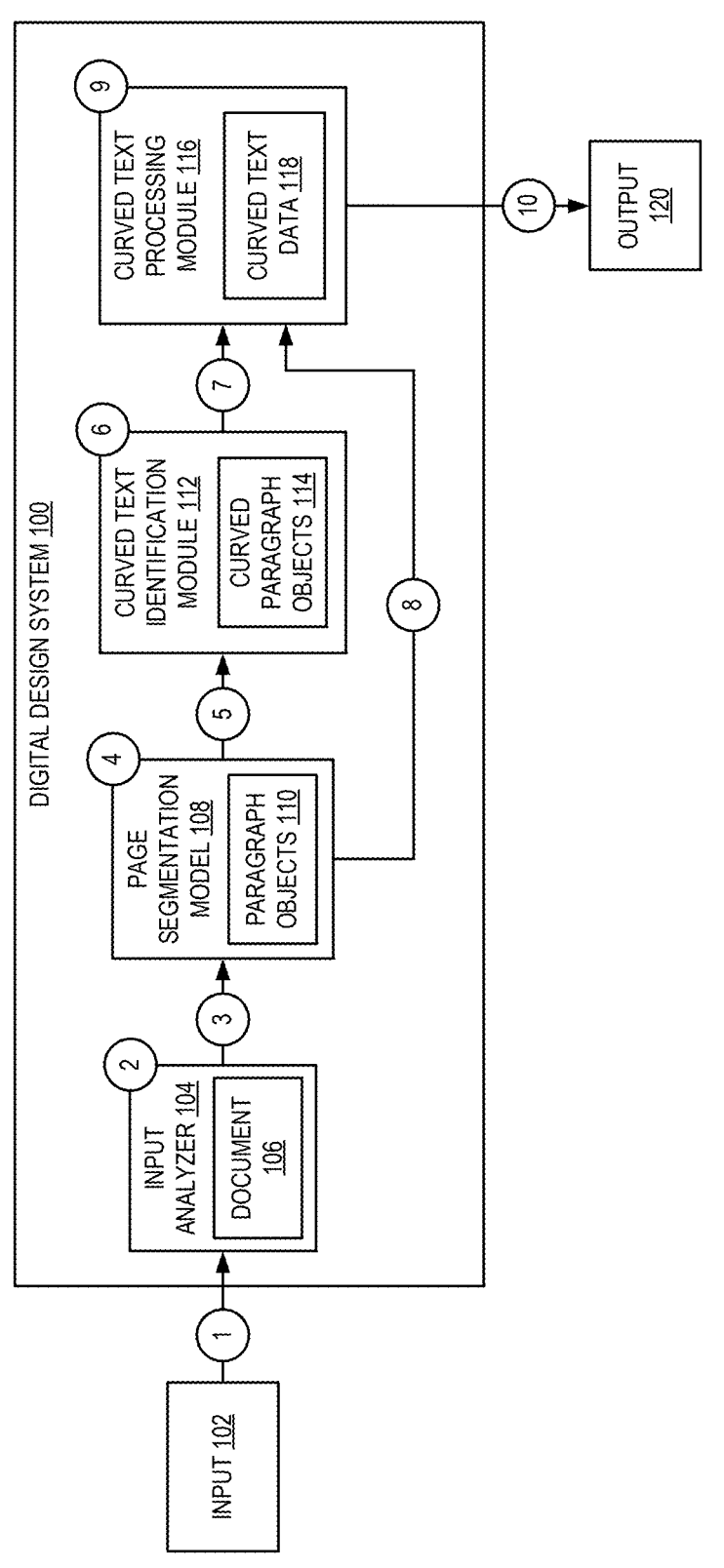
FIG. 1 illustrates a diagram of a process of detecting and processing curved text in a document in accordance with one or more embodiments.

The digital design system of the present disclosure presents improved curved text detection within documents without structural information, while addressing the limitations of the existing techniques. One advantage of the digital design system of the present disclosure is that it results in a highly accurate and fast detection of curved text in a PDF over techniques that utilize complex neural network architectures. Another advantage is that the technique can fix incorrect merges or incorrect splits of curved text identified by the page segmentation model to ensure that the characters making up the curved text are identified correctly. The technique can also be used to enhance optical character recognition (OCR) capabilities when text is curved or warped to increase the accuracy of identified text as well as assist in the correct segmentation of text into words and paragraphs. OCR has a wide-range of utilities including, but not limited to, advertising and signage, street sign detection, license plate number detection, inventory management using product labels, scanning and editing documents. etc., which can be improved by integrating the technique into OCR tools FIG. 1 illustrates a diagram of a process of detecting and processing curved text in a document in accordance with one or more embodiments. As shown in FIG. 1, a digital design system 100 receives an input 102, as shown at numeral 1. For example, the digital design system 100 receives the input 102 from a user via a computing device or from a memory or storage location, where the input 102 includes at least a document (e.g., document 106). In one or more embodiments, document 106 includes information on how to render the content on the page(s) of the document. For example, document 106 can be a portable document format (PDF) document, in which there are no "paragraph" or "text lines," but a sequence of commands to place different characters at different positions on the page. In one or more embodiments, the input 102 can be provided in a graphical user interface (GUI). For example, the document 106 can be provided to the digital design system 100, or a user can indicate a storage location (e.g., on a computing device) or a URL to a location storing the document 106.

The digital design system 100 includes an input analyzer 104 that receives the input 102. In some embodiments, the input analyzer 104 is configured to extract the document 106 from the input 102, at numeral 2. The input analyzer 104 then sends the document 106 to a page segmentation model 108, as shown at numeral 3. In one or more embodiments, the page segmentation model 108 is trained to predict the structure of the document 106, at numeral 4. In one or more embodiments, the page segmentation model 108 includes a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the page segmentation model 108 uses machine learning to segment document 106 based on component or object type. Example component or object types detected by the page segmentation model 108 can include paragraphs, headings, list-items, footnotes, figures, tables, etc. The page segmentation model 108 further can generate a bounding box for each detected component or object in the document 106 and label each bounding box with its corresponding component or object type. In one or more embodiments, paragraph objects 110 detected by the page segmentation model 108 are then passed to a curved text identification module 112, as shown at numeral 5.

The curved text identification module 112 identifies paragraph objects 110 that include curved text, at numeral 6. The curved text identification module 112 is configured to identify the paragraph objects 110 that include curved text by comparing the positions of baselines of text runs in each paragraph object of the paragraph objects 110. When the baselines of consecutive text runs and the baselines of alternating text runs within a paragraph object have non-zero baseline differences, the curved text identification module 112 determines that the paragraph object includes curved text and the paragraph object is marked as a curved paragraph object. This process is repeated for each of the paragraph objects to determine the curved paragraph objects 114 in the document 106. The curved paragraph objects 114 are then sent to a curved text processing module 116, as shown at numeral 7. In one or more embodiments, the paragraph objects 110 identified by the page segmentation model 108 can also be passed to the curved text processing module 116, as shown at numeral 8.

In one or more embodiments, curved text processing module 116 processes the paragraph objects 110 and the curved paragraph objects 114 to generate curved text data 118, at numeral 9. In one or more embodiments, the curved text processing module 116 processes the curved paragraph objects 114 by performing one or more of a series of operations, including merging any curved paragraph objects that were incorrectly split by the page segmentation model 108, ordering the text in the curved paragraph objects 114, splitting any curved paragraph objects of the curved paragraph objects 114 that were incorrectly merged by the page segmentation model 108, and/or correcting any incorrect spacings between characters in the curved paragraph objects 114. Additional details of the processing performed by the curved text processing module 116 are described with respect to FIGS. 4-7. The output of processing the curved paragraph objects 114 through the curved text processing module 116 is curved text data 118.

After the curved text processing module 116 generates the curved text data 118, the curved text data 118 can be sent as an output 120, as shown at numeral 9. In one or more embodiments, after the process described above in numerals 1-8, the output 120 is sent through a communications channel to the user device or computing device that provided the input, to another computing device associated with the user or another user, or to another system or application. For example, the curved text data 118 can be used for rendering and editing of the curved text in graphics editors.

Figure 2:
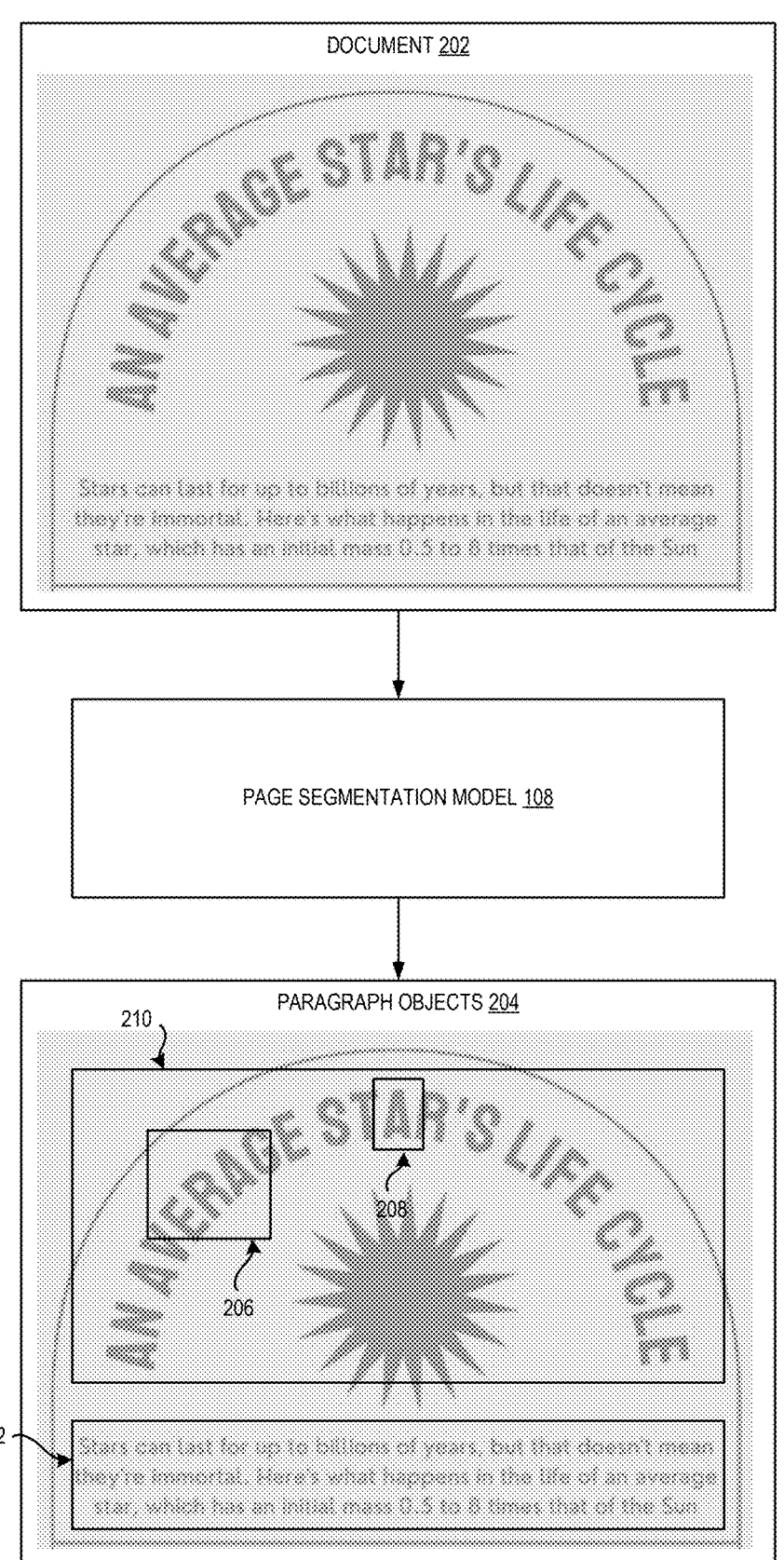
FIG. 2 illustrates a diagram of a page segmentation model generating paragraph objects from a document using a neural network in accordance with one or more embodiments.

FIG. 2 illustrates a diagram of a page segmentation model generating paragraph objects from a document using a neural network in accordance with one or more embodiments. As illustrated in FIG. 2, a document 202 is passed through a page segmentation model 108. In one or more embodiments, the page segmentation model 108 is a deep-learning model for page-decomposition/page-analysis. In some embodiments, the page segmentation model 108 is the YODA model. The page segmentation model 108 can output information indicating a plurality of different object types (e.g., paragraphs, headings, list-items, footnotes, figures, tables, etc.). In one or more embodiments, the identified paragraph objects are stored or captured, while other object types can be ignored. In some embodiments, heading objects are treated as paragraph objects. In the example of FIG. 2, after passing the document 202 through the page segmentation model 108, a set of paragraph objects 204 is identified. The set of paragraph objects 204 includes paragraph object 206, paragraph object 208, paragraph object 210, and paragraph object 212, which can vary in size from a single character to a block of multiple words and text runs.

Figure 3:
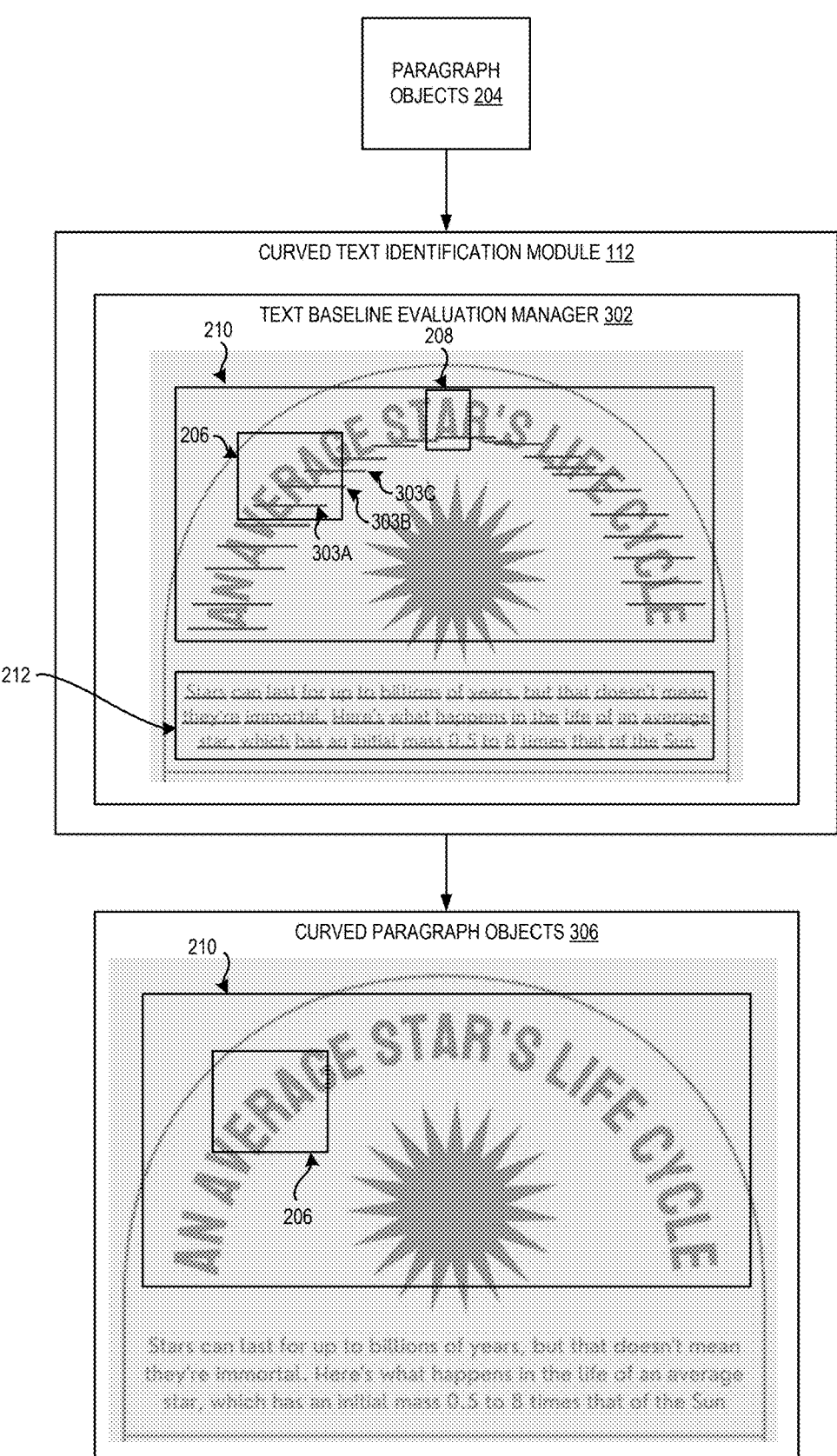
FIG. 3 illustrates a diagram of a curved text identification module identifying curved paragraph objects in a document in accordance with one or more embodiments.

FIG. 3 illustrates a diagram of a curved text identification module identifying curved paragraph objects in a document in accordance with one or more embodiments. In one or more embodiments, the curved text identification module 112 includes a text baseline evaluation manager 302 configured to identify and evaluate the positions of baselines of text runs of each paragraph object identified in a document. For each paragraph object of the paragraph objects 204, the text baseline evaluation manager 302 first compares the baselines of each pair of consecutive text runs within the paragraph object. In one or more embodiments, a text run is defined by the content stream of a PDF document, and each text run can be of varying lengths and contents. For example, a text run can be a single word, a series of words, a single character, or portions of one or more words, where all of the characters in a text run share a single property set (e.g., font style, font family, font color, angle, etc.). In one or more embodiments, the comparison by the text baseline evaluation manager 302 ignores/skips potential subscripts and superscripts. If the difference in the baselines of any two consecutive text runs is determined to be zero, the paragraph object is identified as being non-curved and no further comparisons are made for that paragraph object.

If all consecutive text runs in a paragraph object have non-zero baseline differences, the text baseline evaluation manager 302 then compares the baselines of every pair of alternating text runs. The number of non-zero baseline differences between alternating text runs is used to determine if a paragraph object will be identified as being curved. In some embodiments, as curved text can also have alternating text runs with the same baseline (e.g., text runs in the middle of symmetrically curved text), a nominal number of zero baseline differences between alternating text runs is permitted. In one embodiment, the tolerance for the number of alternating baselines with baseline differences of zero can be set to 20 percent of the total number of alternating baseline comparison. If the number of alternating text runs with zero baseline differences is greater than the tolerance, the text baseline evaluation manager 302 marks the paragraph object as being not curved. For example, if a paragraph object includes ten alternating baseline comparisons and the tolerance is 20 percent, at most two alternating baseline comparisons can have a baseline difference of zero for the paragraph object to be determined to include curved text. Conversely, if the number of alternating text runs with baseline differences of zero is less than the tolerance, the paragraph object is marked as curved. If a paragraph object is determined to include curved text, the paragraph object is added to the set of curved paragraph objects 114.

Continuing the example of FIG. 2, for each paragraph object of the set of paragraph objects 204 identified in document 202, the text baseline evaluation manager 302 evaluates the baselines of text runs in the paragraph object. In FIG. 3, the baselines are indicated by the horizontal lines, where each distinct horizontal line is a text run. For paragraph object 206, the text baseline evaluation manager 302 evaluates the baselines 303A-303C soon of three text runs: "E," "R," and "A," respectively. As baseline 303A and baseline 303B have a non-zero baseline difference and baseline 303B and baseline 303C have a non-zero baseline difference, the text baseline evaluation manager 302 then evaluates the baseline difference of baseline 303A and baseline 303C (e.g., the alternating baselines). As baseline

303A and baseline 303C have a non-zero baseline difference, paragraph object 206 is identified/marked as being a curved paragraph object.

Paragraph object 208 includes a text run of a single text character, "A." As such, the text baseline evaluation manager 302 determines that paragraph object 208 does not include curved text as it cannot perform a comparison with a single character/text run. For paragraph object 210, each character is a text run, and similar to paragraph object 206, the text baseline evaluation manager 302 compares consecutive and alternating baselines of the text runs to determine that paragraph object 210 is a curved paragraph object. For paragraph object 212, the text baseline evaluation manager 302 evaluates the baseline of "Stars" and "can," and determines that they have a baseline difference of zero. In one or more embodiments, based on this determination, the text baseline evaluation manager 302 stops any further comparisons within paragraph object 212 and determines that paragraph object 212 is not a curved paragraph object.

After the evaluation by the text baseline evaluation manager 302, a set of curved paragraph objects 306 includes paragraph object 206 and paragraph object 210.

Figure 4:
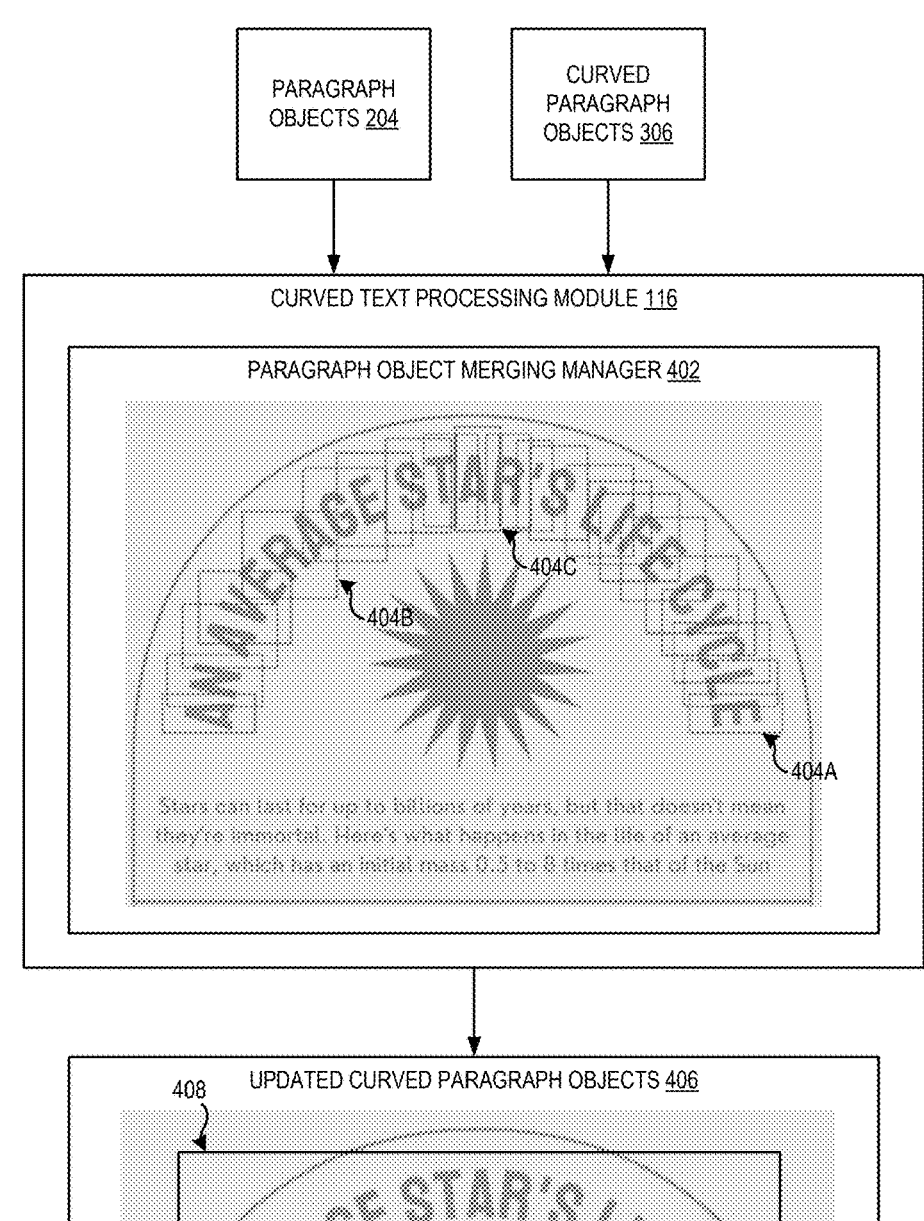
FIG. 4 illustrates a diagram of a curved text processing module merging incorrectly split curved paragraph objects in accordance with one or more embodiments.

FIG. 4 illustrates a diagram of a curved text processing module merging incorrectly split curved paragraph objects in accordance with one or more embodiments. In one or more embodiments, the curved text processing module 116 includes a paragraph object merging manager 402 configured to identify and merge incorrectly split curved paragraph objects. In some situations, a page segmentation model (e.g., page segmentation model 108) may split curved text into multiple paragraph objects when they should correctly be included in a single curved paragraph object. In one or more embodiments, to merge any curved paragraph objects that were incorrectly split by the page segmentation model 108, the paragraph object merging manager 402 first identifies candidate pairs of consecutive paragraph objects for merging. The candidate pairs are pairs of consecutive paragraph objects where either: (1) both paragraph objects of the pair of consecutive paragraph objects include curved text (e.g., are in the set of curved paragraph objects 114); or (2) a pair of consecutive paragraph objects where one paragraph object is curved and the other paragraph object includes text lines with only a single text run. Once a candidate pair is identified, the candidate pair are merged if all of the following conditions are satisfied: (1) the font of the last text run of the first paragraph object and the font of the first text run of the second paragraph object are the same; (2) the color of the last text run of the first paragraph object and the color of the first text run of the second paragraph object are the same; (3) the height of the last text run of the first paragraph object and the height of the first text run of the second paragraph object are the same or within a defined range (e.g., within a 5% variation); and (4) the Euclidean distance between the first paragraph object and the second paragraph object is a valid distance value (e.g., a threshold range). In some embodiments, the valid distance values are less than twice the average character width of the characters in the first paragraph object and the second paragraph object.

Using the example from FIG. 3, the paragraph object merging manager 402 receives curved paragraph objects 306 generated by the curved text identification module 112. The paragraph object merging manager 402 also receives the original paragraph objects 204 identified by the page segmentation model 108. The original paragraph objects 204 split the title, "AN AVERAGE STAR'S LIFE CYCLE" into three separate objects: "AN AVEGE STR'S LIFE CYCLE,"

"RA," and "A." The paragraph object merging manager 402 then determines whether there are any candidate paragraph objects for merging.

Assuming paragraph object 210 and paragraph object 206 are consecutive paragraphs, they qualify as a candidate pair because paragraph object 210 and paragraph object 206 are both curved paragraph objects (as determined by the curved text identification module 112 in FIG. 3). The paragraph object merging manager 402 then evaluates the last text run 404A of paragraph object 210 and the first text run 404B of paragraph object 206 to compare their font type, color, height, and Euclidean distance. As the font, color, and height of the text runs are the same, and the Euclidean distance is valid (e.g., paragraph object 206 is within paragraph object 210 so they are within the valid range), paragraph object 210 and paragraph object 206 are candidate for merging. This allows paragraph object 210 and paragraph object 206 to be merged.

Similarly, paragraph object 210 and paragraph object 208 qualify as a candidate pair because paragraph object 210 was previously determined to be a curved paragraph object and paragraph object 208 is a paragraph object includes text lines with only a single text run (e.g., the single character "A"). The paragraph object merging manager 402 then evaluates the last text run 404A of paragraph object 210 and the first text run 404C of paragraph object 208 to compare their font type, color, height, and Euclidean distance. As the font, color, and height of the text runs are the same, and the Euclidean distance is valid (e.g., paragraph object 208 is within paragraph object 210 so they are within the valid range). This allows paragraph object 210 and paragraph object 208 to be merged. Once merged, the resulting set of updated curved paragraph objects 406 includes a single curved paragraph object 408, which includes all the characters of the title, "AN AVERAGE STAR'S LIFE CYCLE."

Figure 5:
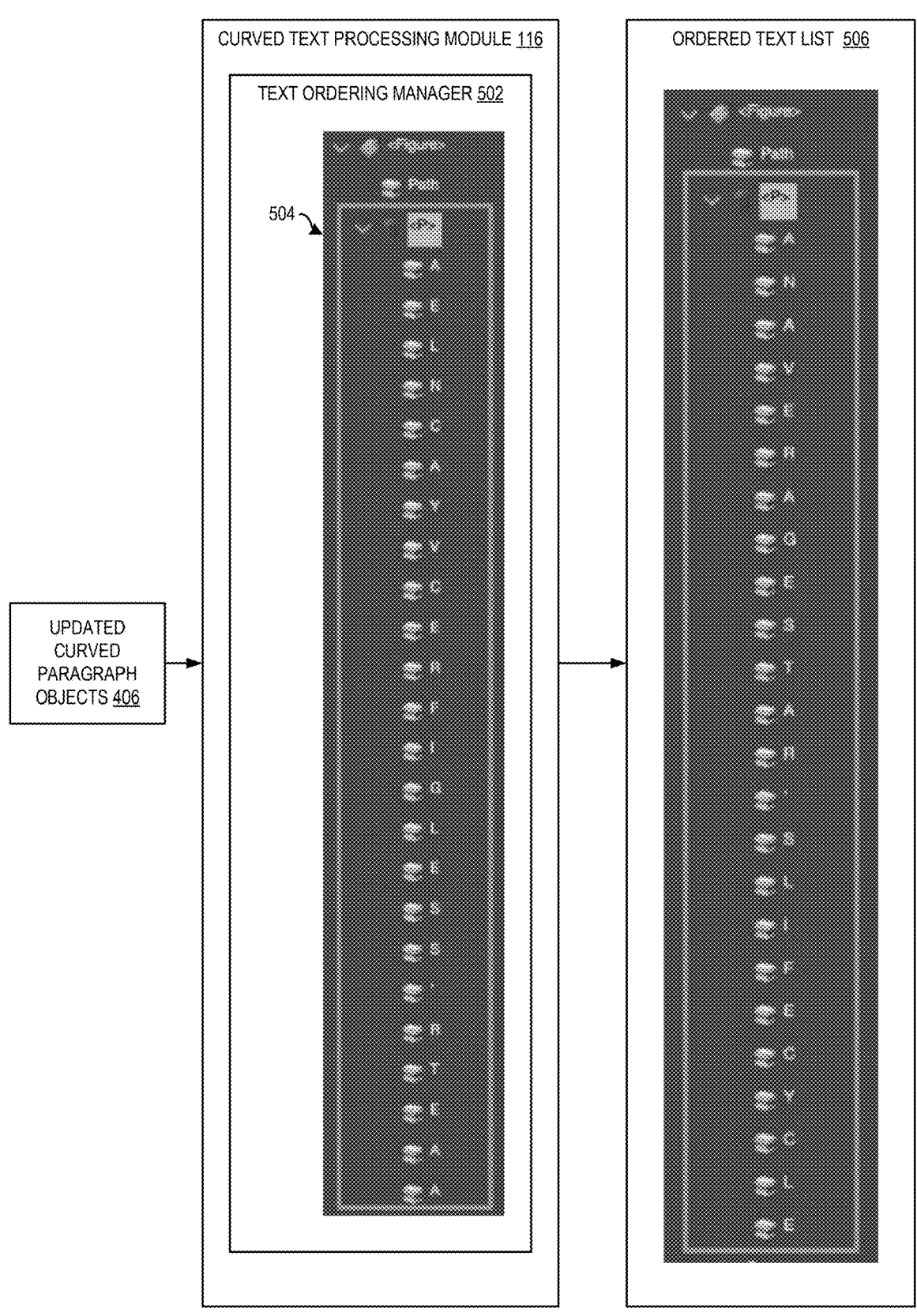
FIG. 5 illustrates a diagram of a curved text processing module performing a text ordering process in accordance with one or more embodiments.

FIG. 5 illustrates a diagram of a curved text processing module performing a text ordering process in accordance with one or more embodiments. In one or more embodiments, the curved text processing module 116 includes a text ordering manager 502 configured to order the text within each curved paragraph object into the correct order. The text ordering manager 502 first generates or accesses an initial list of all text runs in a curved paragraph object. The text ordering manager 502 then moves all the text runs under the first text line of the curved paragraph object by ordering them on the basis of their serial number (e.g., identifier values in the content stream of the document). In such embodiments, the text ordering manager 502 assumes that the order of the text runs in the curved text was correct in the content stream of the document.

In other embodiments, the order of the text runs can be predicted based on their placement/location on a page of the document. In such embodiments, if the language of the document is given or can be determined, the writing mode of the language can be determined and used to determine the order of the characters/text runs. For example, all Latin-based languages (e.g., English, Spanish, French, etc.) are written left to right; hence, if character A is located to the left of character B in curved text of English, character A would precede character B. Conversely, if the document includes text in a language that is written right to left (e.g., Arabic), character B would precede character A. In some embodiments, in the case of circular text, natural language processing (NLP) can be used to further determine the correct starting point and order of the characters.

Using the example from FIG. 4, the text ordering manager 502 receives updated curved paragraph objects 406 generated by the paragraph object merging manager 402. In some embodiments, if there was no paragraph merging required or performed, the text ordering manager 502 can receive the curved paragraph objects from the curved text identification module 112 directly. In one or more embodiments, an initial list of text runs 504 includes each of the text runs in curved paragraph object 408 from FIG. 4. As illustrated in FIG. 5, each text run in the initial list of text runs 504 for paragraph object 408 is a single character. However, the characters in the initial list of text runs 504 are not ordered correctly. The text ordering manager 502 then moves all the text runs under the first text line of curved paragraph object 408 by ordering them on the basis of their serial number as determined from the content stream for document 202, resulting in the output of ordered text list 506.

FIG. 6 illustrates a diagram of a curved text processing module splitting incorrectly merged curved paragraph objects in accordance with one or more embodiments. In one or more embodiments, the curved text processing module 116 includes a paragraph object splitting manager 604 configured to identify and split incorrectly merged curved paragraph objects. In some situations, the page segmentation model 108 may merge curved text into a single curved paragraph object when the curved text should correctly be split into multiple curved paragraph objects. In one or more embodiments, to split any curved paragraph objects that were incorrectly merged by the page segmentation model 108, the paragraph object splitting manager 604 evaluates each of curved paragraph objects received as input. For each curved paragraph object, the paragraph object splitting manager 604 evaluates each consecutive pair of text runs in the curved paragraph object to determine if they satisfy the following conditions: (1) the font of the first text run and the second text run of the consecutive pair of text runs are the same; (2) the color of the first text run and the second text run of the consecutive pair of text runs are the same; (3) the height of the first text run and the second text run of the consecutive pair of text runs are the same or within a defined range (e.g., within a 5% variation), unless either of the text runs is a subscript or superscript. If any of the conditions above are not satisfied, all text runs in that curved paragraph object, starting from the mismatched text run are moved into a new curved paragraph object and the evaluation continues on subsequent curved paragraph objects, starting from the newly created curved paragraph object.

As illustrated in FIG. 6, the paragraph object splitting manager 604 receives curved paragraph objects 602. Image 606 is a representation of a portion of a received document that includes a curved paragraph object. In this example, image 606 shows a single curved paragraph object that includes a plurality of text runs (e.g., indicated by the bounding boxes) positioned across four lines. The paragraph object splitting manager 604 analyzes or evaluates each consecutive pair of text runs in curved paragraph object of image 606. For example, the paragraph object splitting manager 604 may evaluate text run 608A (e.g., text character "B") and text run 608B (e.g., text character "U") by comparing their font, color, and height. As text run 608A and text run 608B have the same font, color, and height, they do not need to be split into separate paragraph objects. The paragraph object splitting manager 604 can continue to evaluate consecutive text runs in the first line of text. When the paragraph object splitting manager 604 evaluates text run 608C (e.g., text character "N") and text run 608D (e.g., text string "HALF"), the paragraph object splitting manager 604 can determine that they have different fonts (e.g., text run 608D is bolder), different colors (e.g., text run 608C is white, and text run 608D is blue), and different heights (e.g., text run 608D has a greater height than text run 608C). Based on this evaluation, text run 608D and all text runs subsequent to text run 608D are moved to a new curved paragraph object. The paragraph object splitting manager 604 then continues its evaluation of subsequent text runs to determine whether they should be split from the new curved paragraph object. In one or more embodiments, the resulting output is a set of updated curved paragraph objects 610. For example, after processing curved paragraph objects 602, the single curved paragraph object of image 606 is split into four new curved paragraph objects 612A-612D.

FIG. 7 illustrates a diagram of a curved text processing module determining the placement of spaces between text runs in curved paragraph objects in accordance with one or more embodiments. In one or more embodiments, the curved text processing module 116 includes a curved paragraph spacing manager 704 configured to correct incorrect spacings between text runs in the curved text of curved paragraph objects. The curved paragraph spacing manager 704 first calculates a curved string length by summing the distances between the centers of the bounding boxes of each text run. The curved string length is then used to calculate the average character width in the curved string. In such embodiments, the average character width in the curved string is calculated to minimize the effect of characters that may have narrower or wider bounding boxes (e.g., "I" and "w"). In some embodiments, the calculation of the average character width can be expressed as follows:

$$\text{Average Character Width for a Curved Paragraph Object} =$$
$$\frac{\text{Sum of Distances of Consecutive Centers of Text Runs}}{\text{Total Number of Characters} - (0.5 \times Char_1) - (0.5 \times Char_2)}$$

where $Char_1$ is the total number of characters in the first text run and $Char_2$ is the total number of characters in the last text run, and where half of these values are subtracted to account for the distance that is not included in the numerator.

Using, the average character width, a permitted character width is then calculated. In one or more embodiments, the permitted character width is calculated as 130% of the average character width, or:

$$\text{Permitted Character Width} = 1.3 \times \text{Average Character Width}$$

In other embodiments, the permitted character width can be calculated using different values. As the number of characters in a text run can get greater than one, if the distance between the centers of the last character of the first text run and first character of the second text run (e.g., the next text run) is found to be greater than the permitted character width, a space character is added between these text runs.

A non-permitted character width can also be calculated as:

$$\text{Non-Permitted Character Width} = 0.7 \times \text{Average Character Width}$$

If the distance between the centers of the last character of the first text run and first character of the second text run is found to be lesser than the non-permitted character width and a space character exists between them, the space character is removed.

As illustrated in FIG. 7, a curved paragraph object 702 is provided to a curved paragraph spacing manager 704 of a curved text processing module 116. The curved paragraph spacing manager 704 calculates a curved string length by summing the distances between the centers of the bounding boxes of each text run of curved paragraph object 702. Based on the example illustrated in FIG. 7, the curved string length is 352. The average character width is then calculated as follows:

$$\text{Average Character Width} = \frac{352}{15 - (0.5) - (0.5)} = 25.14$$

where $Char_1$ and $Char_2$ are "1" as each text run in curved paragraph object 702 is a single character. The permitted character width can then be calculated as follows:

$$\text{Permitted Character Width} = 1.3 \times 25.14 = 32.68$$

Thus, any distance(s) between the centers of the last character of the first text run and first character of the second text run in every pair of consecutive text runs of curved paragraph object 702 that are greater than the permitted character width of 32.68, are locations where a space is needed. For example, as the distance between the characters "L" and "M" in curved paragraph object 702 is 38, a space is added after the "L." This ensures that the curved text in curved paragraph object 702 is identified as "DIGITAL MARKETER" instead of "DIGITALMARKETER."

FIG. 8 illustrates a schematic diagram of a digital design system (e.g., "digital design system" described above) in accordance with one or more embodiments. As shown, the digital design system 800 may include, but is not limited to, a user interface manager 802, an input analyzer 804, a page segmentation model 806, a curved text identification module 808, a curved text processing module 810, a neural network manager 812, and a storage manager 814. The storage manager 814 includes input data 818 and curved text data 820.

As illustrated in FIG. 8, the digital design system 800 includes a user interface manager 802. For example, the user interface manager 802 allows users to provide input data to the digital design system 800. In some embodiments, the user interface manager 802 provides a user interface through which the user can upload a document (e.g., a PDF document), as discussed above. Alternatively, or additionally, the user interface may enable the user to download the document from a local or remote storage location (e.g., by providing an address, such as a URL or other endpoint, associated with a data source).

As further illustrated in FIG. 8, the digital design system 800 also includes an input analyzer 804 that receives an input (e.g., from the user interface manager 802). The input analyzer 804 analyzes the input received to identify the document from the input.

As further illustrated in FIG. 8, the digital design system 800 also includes a page segmentation model 806 trained to segment an input document based on component or object type. In one or more embodiments, example component or object types detected by the page segmentation model 806 can include paragraphs, headings, list-items, footnotes, figures, tables, etc. In some embodiments, heading objects are treated as paragraph objects. The page segmentation model

806 can also generate a bounding box for each detected component or object in the document and label each bounding box with its corresponding component or object type.

In one or more embodiments, the page segmentation model 806 includes a trained neural network 816 to perform the segmentation of the document. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 8, the digital design system 800 also includes a curved text identification module 808 configured to analyze the paragraph objects identified by the page segmentation model 806 to identify the paragraph objects that include curved text. The curved text identification module 808 identifies the paragraph objects that include curved text by comparing the positions of baselines of text runs in each paragraph object. When the baselines of any pair of consecutive text runs of a paragraph object have a baseline difference of zero, the curved text identification module 808 determines that the paragraph object does not include curved text. When the baselines of all pairs of consecutive text runs and the baselines of nearly all pairs (based on a tolerance) of alternating text runs within a paragraph object have non-zero baseline differences, the curved text identification module 808 determines that the paragraph object includes curved text and the paragraph object is marked as a curved paragraph object. When the baselines of all pairs of consecutive text runs have non-zero baseline differences, but the baselines of alternating text runs have a baseline difference of zero, the curved text identification module 808 determines that the paragraph object does not include curved text. This process is repeated for each of the paragraph objects to determine the curved paragraph objects in the document.

As further illustrated in FIG. 8, the digital design system 800 also includes a curved text processing module 810. The curved text processing module 810 processes the curved paragraph objects by performing one or more of a series of operations. These operations can include merging any curved paragraph objects that were incorrectly split, or splitting any curved paragraph objects that were incorrectly merged by the page segmentation model 806. These operations can further include processing of the text in curved paragraph objects, including ordering the characters of the text in the curved paragraph objects in the correct order and correcting any incorrect spacing issues between text runs in the curved paragraph objects.

As illustrated in FIG. 8, the digital design system 800 also includes a neural network manager 812. Neural network manager 812 may host a plurality of neural networks or other machine learning models, such as neural network 816. The neural network manager 812 may include an execution environment, libraries, and/or any other data needed to execute the machine learning models. In some embodiments, the neural network manager 812 may be associated with dedicated software and/or hardware resources to execute the machine learning models. Although depicted in FIG. 8 as being hosted by a single neural network manager 812, in various embodiments the neural networks may be hosted in multiple neural network managers and/or as part of different components.

As illustrated in FIG. 8, the digital design system 800 also includes the storage manager 814. The storage manager 814 maintains data for the digital design system 800. The storage manager 814 can maintain data of any type, size, or kind as necessary to perform the functions of the digital design system 800. The storage manager 814, as shown in FIG. 8, includes input data 818 and curved text data 820. In particular, the input data 818 may include a document received by the digital design system 800. The curved text data 820 can include the output of processing the document through the digital design system 800, including data indicating the identified curved text paragraph objects and the ordering and correct spacing of the text within the curved text paragraph.

Each of the components 802-814 of the digital design system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the digital design system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 of the digital design system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the digital design system 800 may be implemented as a stand-alone application, such as a desktop or mobile application. Furthermore, the components 802-814 of the digital design system 800 may be implemented as one or more web-based applications hosted on a remote server. Alternatively, or additionally, the components of the digital design system 800 may be implemented in a suite of mobile device applications or "apps."

As shown, the digital design system 800 can be implemented as a single system. In other embodiments, the digital design system 800 can be implemented in whole, or in part, across multiple systems. For example, one or more functions of the digital design system 800 can be performed by one or more servers, and one or more functions of the digital design system 800 can be performed by one or more client devices. The one or more servers and/or one or more client devices may generate, store, receive, and transmit any type of data used by the digital design system 800, as described herein.

In one implementation, the one or more client devices can include or implement at least a portion of the digital design system 800. In other implementations, the one or more servers can include or implement at least a portion of the digital design system 800. For instance, the digital design system 800 can include an application running on the one or more servers or a portion of the digital design system 800 can be downloaded from the one or more servers. Additionally, or alternatively, the digital design system 800 can include a web hosting application that allows the client device(s) to interact with content hosted at the one or more server(s).

For example, upon a client device accessing a webpage or other web application hosted at the one or more servers, in one or more embodiments, the one or more servers can provide access to one or more files including documents (e.g., PDF documents) stored at the one or more servers. The one or more servers can then automatically perform the methods and processes described above to identify and process curved text in the documents.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

FIGS. 1-8, the corresponding text, and the examples, provide a number of different systems and devices that identify and process curved text in documents (e.g., PDF documents). In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of identifying and processing curved text in a document by a digital design system in accordance with one or more embodiments. In one or more embodiments, the method 900 is performed in a digital medium environment that includes the digital design system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of identifying, by a page segmentation model, a plurality of paragraph objects in a document. In one or more embodiments, the page segmentation model is a deep-learning model for page-decomposition/page-analysis. In some embodiments, the page segmentation is the YODA model. The page segmentation model can output information indicating a plurality of different object types (e.g., paragraphs, headings, list-items, footnotes, figures, tables, etc.). In one or more embodiments, the identified paragraph objects are stored or captured, while other object types can be ignored. In some embodiments, heading objects are treated as paragraph objects by the digital design system. The set of paragraph objects identified by the page segmentation model can vary in size from a single character to a block of multiple words and text runs.

As illustrated in FIG. 9, the method 900 includes an act 904 of determining that a paragraph object of the plurality of paragraph objects includes curved text in view of positions of baselines of text runs in the paragraph object. In one or more embodiments, the digital design system includes a curved text identification module that includes a text baseline evaluation manager configured to identify and evaluate the baselines of text runs of each paragraph object identified by the page segmentation model. For each paragraph object, the text baseline evaluation manager first compares the baselines of each pair of consecutive text runs within the paragraph object. In one or more embodiments, a text run is defined by the content stream of the document, and each text run can be of varying lengths and contents. For example, a text run can be a single word, a series of words, a single character, or portions of one or more words, where all of the characters in a text run share a single property set (e.g., font style, font family, font color, angle, etc.). In one or more embodiments, the comparison by the text baseline evaluation manager ignores/skips potential subscripts and superscripts. If the difference in the baselines of any two consecutive text runs is determined to be zero, the paragraph object is identified as being non-curved and no further comparisons are made for that paragraph object.

If all consecutive text runs in a paragraph object have non-zero baseline differences, the text baseline evaluation manager then compares the baselines of every pair of alternating text runs. The number of non-zero baseline differences between alternating text runs is used to determine if a paragraph object will be identified as being curved. In some embodiments, as curved text can also have alternating text runs with the same baseline (e.g., text runs in the middle of symmetrically curved text), a nominal number of zero baseline differences between alternating text runs is permitted. In one embodiment, the tolerance for the number of alternating baselines with baseline differences of zero can be set to 20% of the total number of alternating baseline comparison. For example, if a paragraph object includes ten alternating baseline comparisons, at most two alternating baseline comparisons can have a baselines difference of zero for the paragraph object to be determined to include curved text. If the number of alternating text runs with zero baseline differences is greater than the tolerance, the text baseline evaluation manager 302 marks the paragraph object as being non-curved. If a paragraph object is determined to include curved text, the paragraph object is marked, or otherwise flagged, or added to a set of curved paragraph objects.

As illustrated in FIG. 9, the method 900 includes an act 906 of determining spacing data for text runs of the curved text in the paragraph object. In one or more embodiments, determining spacing data for text runs of the curved text in the paragraph object is an example process that the digital design system can perform on the paragraph objects with curved text. In one or more embodiments, a curved text processing module includes a curved paragraph spacing manager configured to determine or correct the spacing between text runs in the curved text of curved paragraph objects. The curved paragraph spacing manager first calculates a curved string length by summing the distances between the centers of the bounding boxes of each text run in the curved text. The curved string length is then used to calculate the average character width in the curved string. In some embodiments, the calculation of the average character width can be expressed as follows:

$$\text{Average Character Width for a Curved Paragraph Object} =$$

$$\frac{\text{Sum of Distances of Consecutive Centers of Text Runs}}{\text{Total Number of Characters} - (0.5 \times Char_1) - (0.5 \times Char_2)}$$

where $Char_1$ is the total number of characters in the first text run in a paragraph object and $Char_2$ is the total number of characters in the last text run in the paragraph object. Because the left half of $Char_1$ and the right half of $Char_2$ are not included in sum calculated for the numerator, half of the values of $Char_1$ and $Char_2$ are subtracted out from the total number of characters.

Using, the average character width, a permitted character width and a non-permitted character width are calculated. In one or more embodiments, the permitted character width and the non-permitted character width can be calculated as follows:

$$\text{Permitted Character Width} = 1.3 \times \text{Average Character Width}$$

$$\text{Non-Permitted Character Width} = 0.7 \times \text{Average Character Width}$$

If the distance between the centers of the last character of the first text run and first character of the second text run is found to be greater than the permitted character width, a space character is added between these text runs. If the distance between the centers of the last character of the first text run and first character of the second text run is found to be lesser than the non-permitted character width and a space character exists between them, the space character is removed.

In one or more embodiments, the digital design system can further process the paragraph objects that include curved text by merging incorrectly split paragraph objects, splitting incorrectly merged paragraph objects, and determining an order of text runs of the curved text in the paragraph object.

In one or more embodiments, to merge incorrectly split paragraph objects, the digital design system identifies a pair of consecutive paragraph objects that each includes curved text as candidates for merging. The candidates for merging are merged based on determining that the font data, text color data, and text height data of the first paragraph object and the second paragraph object match, and a distance between the first paragraph object and the second paragraph object is within a threshold range.

In one or more embodiments, to split incorrectly merged paragraph objects, the digital design system compares font data, text color data, and text height data of a first text run of a pair of consecutive text runs in a paragraph object and a second text run of the pair of consecutive text runs in the same paragraph object. If the font data, text color data, and/or text height data for the two text runs do not match, the digital design system splits the second text run into a new, second paragraph object.

In one or more embodiments, determining an order of characters of the curved text in the paragraph object includes generating or accessing an initial list of all text runs in a curved paragraph object. The text ordering manager then moves all the text runs under the first text line of the curved paragraph object by ordering them on the basis of their serial numbers. The serial numbers are identifier values that are in the content stream of the document which can indicate an order of the character/text runs that were entered. In such embodiments, the text ordering manager assumes that the order of the text runs in the curved text was correct in the content stream of the document. In other embodiments, the order of the text runs can be predicted based on their placement/location on a page of the document.

As illustrated in FIG. 9, the method 900 includes an act 908 of presenting output data representing the curved text using the spacing data for the text runs of the curved text. In one or more embodiments, the output data indicates the paragraph objects with curved text and the spacing data between the text runs of the curved text. The output data can be used for rendering and editing of the curved text in graphics editors.

FIG. 10 illustrates a flowchart of a series of acts in a method 1000 of identifying and processing curved text in a document by a digital design system in accordance with one or more embodiments. In one or more embodiments, the method 1000 is performed in a digital medium environment that includes the digital design system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of identifying, by a page segmentation model, a plurality of paragraph objects in a document. In one or more embodiments, the page segmentation model is a deep-learning model for page-decomposition/page-analysis. In some embodiments, the page segmentation is the YODA model. The page segmentation model can output information indicating a plurality of different object types (e.g., paragraphs, headings, list-items, footnotes, figures, tables, etc.). In one or more embodiments, the identified paragraph objects are stored or captured, while other object types can be ignored. In some embodiments, heading objects are treated as paragraph objects by the digital design system. The set of paragraph objects identified by the page segmentation model can vary in size from a single character to a block of multiple words and text runs.

As illustrated in FIG. 10, the method 1000 includes an act 1004 of determining that a paragraph object of the plurality of paragraph objects includes curved text in view of positions of baselines of text runs in the paragraph object. In one or more embodiments, the digital design system includes a curved text identification module that includes a text baseline evaluation manager configured to identify and evaluate the baselines of text runs of each paragraph object identified by the page segmentation model. For each paragraph object, the text baseline evaluation manager first compares the baselines of each pair of consecutive text runs within the paragraph object. In one or more embodiments, a text run is defined by the content stream of the document, and each text run can be of varying lengths and contents. For example, a text run can be a single word, a series of words, a single character, or portions of one or more words, where all of the characters in a text run share a single property set (e.g., font style, font family, font color, angle, etc.). In one or more embodiments, the comparison by the text baseline evaluation manager ignores/skips potential subscripts and superscripts. If the difference in the baselines of any two consecutive text runs is determined to be zero, the paragraph object is identified as being non-curved and no further comparisons are made for that paragraph object.

If all consecutive text runs in a paragraph object have non-zero baseline differences, the text baseline evaluation manager then compares the baselines of every pair of alternating text runs. The number of non-zero baseline differences between alternating text runs is used to determine if a paragraph object will be identified as being curved. In some embodiments, as curved text can also have alternating text runs with the same baseline (e.g., text runs in the middle of symmetrically curved text), a nominal number of zero baseline differences between alternating text runs is permitted. In one embodiment, the tolerance for the number of alternating baselines with baseline differences of zero can be set to 20% of the total number of alternating baseline comparison. For example, if a paragraph object includes ten alternating baseline comparisons, at most two alternating baseline comparisons can have a baselines difference of zero for the paragraph object to be determined to include curved text. If the number of alternating text runs with zero baseline differences is greater than the tolerance, the text baseline evaluation manager 302 marks the paragraph object as being non-curved. If a paragraph object is determined to include curved text, the paragraph object is marked, or otherwise flagged, or added to a set of curved paragraph objects.

As illustrated in FIG. 10, the method 1000 includes an act 1006 of determining an order of text runs of the curved text in the paragraph object. In one or more embodiments, the digital design system processes the paragraph objects with curved text by determining the order of the text runs of the curved text. This processing includes determining identifier values corresponding to the curved text in the paragraph object based on the content stream of the document. First, a text ordering manager of a curved text processing module generates or accesses an initial list of all text runs in a curved paragraph object. The text ordering manager then moves all the text runs under the first text line of the curved paragraph object by ordering them on the basis of their serial numbers. The serial numbers are identifier values that are in the content stream of the document which can indicate an order of the character/text runs that were entered. In such embodiments, the text ordering manager assumes that the order of the text runs in the curved text was correct in the content stream of the document. In other embodiments, the order of the text runs can be predicted based on their placement/location on a page of the document.

In one or more embodiments, the digital design system can further process the paragraph objects that include curved text by merging incorrectly split paragraph objects, splitting incorrectly merged paragraph objects, and determining spacing data for the characters of the curved text in the paragraph object.

In one or more embodiments, to merge incorrectly split paragraph objects, the digital design system identifies a pair of consecutive paragraph objects that each includes curved text as candidates for merging. The candidates for merging are merged based on determining that the font data, text color data, and text height data of the first paragraph object and the second paragraph object match, and a distance between the first paragraph object and the second paragraph object is within a threshold range.

In one or more embodiments, to split incorrectly merged paragraph objects, the digital design system compares font data, text color data, and text height data of a first text run of a pair of consecutive text runs in a paragraph object and a second text run of the pair of consecutive text runs in the same paragraph object. If the font data, text color data, or text height data for the two text runs do not match, the digital design system splits the second text run into a new, second paragraph object.

In one or more embodiments, determining spacing data for the text runs of the curved text in the paragraph object includes calculating a string length of the curved text in the paragraph object. The string length of the curved text in the paragraph object is a sum of distances between centers of bounding boxes of each text run. The digital design system then calculates a permitted character width based on the calculated string length and a total number of characters in the curved text and determines distances between the last character of the first text run and first character of the second text run in each consecutive pair of text runs in the curved text. For each determined distance for a consecutive pair of text runs that is greater than a permitted character width, the digital design system adds a space character between the consecutive pair of text runs.

As illustrated in FIG. 10, the method 1000 includes an act 1008 of presenting output data representing the curved text using the order of the text runs of the curved text. In one or more embodiments, the output data indicates the paragraph objects with curved text and the order of text runs of the curved text. The output data can be used for rendering and editing of the curved text in graphics editors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
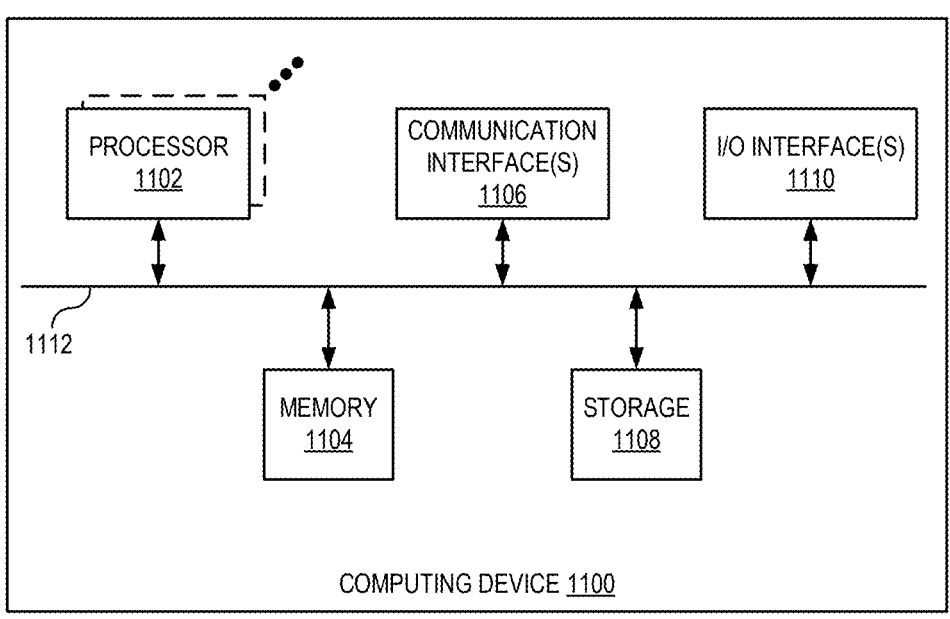
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the digital design system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination of these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
identifying, by a page segmentation model, a plurality of paragraph objects in a document;
determining that a paragraph object of the plurality of paragraph objects includes curved text in view of positions of baselines of text runs in the paragraph object;
determining spacing data for text runs of the curved text in the paragraph object; and
presenting output data representing the curved text using the spacing data for the text runs of the curved text.

2. The method of claim 1, wherein determining that the paragraph object of the plurality of paragraph objects includes the curved text in view of the positions of the baselines of text runs in the paragraph object further comprises:
determining that baseline differences between all baselines of consecutive text runs in the paragraph object are non-zero; and
determining that a number of baseline differences between the baselines of alternating text runs in the paragraph object that are zero are within a tolerance range.

3. The method of claim 1, further comprising:
identifying a pair of consecutive paragraph objects that each includes curved text as candidates for merging, the pair of consecutive paragraph objects including a first paragraph object and a second paragraph object; and
merging the first paragraph object and the second paragraph object based on comparing font data, text color data, and text height data of the first paragraph object and the second paragraph object, and a distance between the first paragraph object and the second paragraph object.

4. The method of claim 1, further comprising:
identifying a pair of consecutive paragraph objects that includes a first paragraph object that includes curved text and a second paragraph object that includes only text lines having single text runs; and
merging the first paragraph object and the second paragraph object based on comparing font data, text color data, and text height data of a last text run of the first paragraph object and a first text run of the second paragraph object, and a distance between the last text run of the first paragraph object and the first text run of the second paragraph object.

5. The method of claim 1, further comprising:
determining an order of the curved text in the paragraph object by:
determining identifier values corresponding to the curved text in the paragraph object based on a content stream of the document, and
identifying an order of the identifier values as the order of the curved text in the paragraph object.

6. The method of claim 1, further comprising:
for each pair of consecutive text runs in the paragraph object, comparing font data, text color data, and text height data of a first text run of a pair of consecutive text runs and a second text run of the pair of consecutive text runs; and
splitting the second text run of the pair of consecutive text run into a second paragraph object when the font data, the text color data, or the text height data of the first text run and the second text run do not match.

7. The method of claim 1, wherein determining the spacing data for the text runs of the curved text in the paragraph object comprise:

calculating a string length of the curved text in the paragraph object, wherein the string length of the curved text in the paragraph object is a sum of distances between centers of bounding boxes of each text run;

calculating a permitted character width based on the calculated string length and a total number of characters in the curved text;

determining distances between a last character of a first text run and a first character of a next text run in each consecutive pair of text runs in the curved text; and for each determined distance that is greater than a permitted character width, adding a space character between the consecutive pair of text runs.

8. A non-transitory computer-readable medium storing executable instructions, which when executed by a processing device, cause the processing device to perform operations comprising:

identifying, by a page segmentation model, a plurality of paragraph objects in a document;

determining that a paragraph object of the plurality of paragraph objects includes curved text in view of positions of baselines of text runs in the paragraph object;

determining spacing data for text runs of the curved text in the paragraph object; and presenting output data representing the curved text using the spacing data for the text runs of the curved text.

9. The non-transitory computer-readable medium of claim 8, wherein the instructions to determine that the paragraph object of the plurality of paragraph objects includes the curved text in view of the positions of the baselines of text runs in the paragraph object further comprise:

determining that baseline differences between all baselines of consecutive text runs in the paragraph object are non-zero; and determining that a number of baseline differences between the baselines of alternating text runs in the paragraph object that are zero are within a tolerance range.

10. The non-transitory computer-readable medium of claim 8, storing instructions that further cause the processing device to perform operations comprising:

identifying a pair of consecutive paragraph objects that each includes curved text as candidates for merging, the pair of consecutive paragraph objects including a first paragraph object and a second paragraph object; and merging the first paragraph object and the second paragraph object based on comparing font data, text color data, and text height data of the first paragraph object and the second paragraph object, and a distance between the first paragraph object and the second paragraph object.

11. The non-transitory computer-readable medium of claim 8, storing instructions that further cause the processing device to perform operations comprising:

identifying a pair of consecutive paragraph objects that includes a first paragraph object that includes curved text and a second paragraph object that includes only text lines having single text runs; and merging the first paragraph object and the second paragraph object based on comparing font data, text color data, and text height data of a last text run of the first paragraph object and a first text run of the second paragraph object, and a distance between the last text run of the first paragraph object and the first text run of the second paragraph object.

12. The non-transitory computer-readable medium of claim 8, storing instructions that further cause the processing device to perform operations comprising:

determining an order of the curved text in the paragraph object by:

determining identifier values corresponding to the curved text in the paragraph object based on a content stream of the document, and identifying an order of the identifier values as the order of the curved text in the paragraph object.

13. The non-transitory computer-readable medium of claim 8, storing instructions that further cause the processing device to perform operations comprising:

for each pair of consecutive text runs in the paragraph object, comparing font data, text color data, and text height data of a first text run of a pair of consecutive text runs and a second text run of the pair of consecutive text runs; and splitting the second text run of the pair of consecutive text run into a second paragraph object when the font data, the text color data, or the text height data of the first text run and the second text run do not match.

14. The non-transitory computer-readable medium of claim 8, wherein the instructions to determine the spacing data for the text runs of the curved text in the paragraph object comprise:

calculating a string length of the curved text in the paragraph object, wherein the string length of the curved text in the paragraph object is a sum of distances between centers of bounding boxes of each text run;

calculating a permitted character width based on the calculated string length and a total number of characters in the curved text;

determining distances between a last character of a first text run and a first character of a next text run in each consecutive pair of text runs in the curved text; and for each determined distance that is greater than a permitted character width, adding a space character between the consecutive pair of text runs.

15. A system comprising:

a memory component; and a processing device coupled to the memory component, the processing device to perform operations comprising:

identifying, by a page segmentation model, a plurality of paragraph objects in a document;

determining that a paragraph object of the plurality of paragraph objects includes curved text in view of positions of baselines of text runs in the paragraph object;

determining an order of text runs of the curved text in the paragraph object; and presenting output data representing the curved text using the order of the text runs of the curved text.

16. The system of claim 15, wherein the operations of determining that the paragraph object of the plurality of paragraph objects includes the curved text in view of the positions of the baselines of text runs in the paragraph object further comprise:

determining that baseline differences between all baselines of consecutive text runs in the paragraph object are non-zero; and determining that a number of baseline differences between the baselines of alternating text runs in the paragraph object that are zero are within a tolerance range.

17. The system of claim 15, wherein the processing device performs further operations comprising:

identifying a pair of consecutive paragraph objects that each includes curved text as candidates for merging, the pair of consecutive paragraph objects including a first paragraph object and a second paragraph object; and merging the first paragraph object and the second paragraph object based on comparing font data, text color data, and text height data of the first paragraph object and the second paragraph object, and a distance between the first paragraph object and the second paragraph object.

18. The system of claim 15, wherein the operations of determining the order of the curved text in the paragraph object further comprise:

determining identifier values corresponding to the curved text in the paragraph object based on a content stream of the document, and identifying an order of the identifier values as the order of the curved text in the paragraph object.

19. The system of claim 15, wherein the processing device performs further operations comprising:

for each pair of consecutive text runs in the paragraph object, comparing font data, text color data, and text height data of a first text run of a pair of consecutive text runs and a second text run of the pair of consecutive text runs; and splitting the second text run of the pair of consecutive text run into a second paragraph object when the font data, the text color data, or the text height data of the first text run and the second text run do not match.

20. The system of claim 15, wherein the processing device performs further operations comprising:

determining spacing between text runs of the curved text in the paragraph object by:

calculating a string length of the curved text in the paragraph object, wherein the string length of the curved text in the paragraph object is a sum of distances between centers of bounding boxes of each text run, calculating a permitted character width based on the calculated string length and a total number of characters in the curved text, determining distances between a last character of a first text run and a first character of a next text run in each consecutive pair of text runs in the curved text, and for each determined distance that is greater than a permitted character width, adding a space character between the consecutive pair of text runs.

* * * * *